United States Patent
Li et al.

(10) Patent No.: US 9,395,751 B2
(45) Date of Patent: Jul. 19, 2016

(54) METHOD AND DEVICE FOR AUTOMATIC CONTROL

(71) Applicant: Lenovo (Beijing) Co., Ltd., Beijing (CN)

(72) Inventors: Fanzhi Li, Beijing (CN); Xuguo Liu, Beijing (CN); Lingjun Xu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/090,501

(22) Filed: Nov. 26, 2013

(65) Prior Publication Data

US 2014/0145937 A1 May 29, 2014

(30) Foreign Application Priority Data

Nov. 28, 2012 (CN) .......................... 2012 1 0495551

(51) Int. Cl.
*G06F 3/041* (2006.01)
*G06F 1/16* (2006.01)
*G06F 1/32* (2006.01)

(52) U.S. Cl.
CPC ............ *G06F 1/1615* (2013.01); *G06F 1/1677* (2013.01); *G06F 1/3206* (2013.01)

(58) Field of Classification Search
CPC .......... G06F 2200/1637; G06F 1/1624; G06F 1/1662; G06F 1/3271; G06F 3/02; G06F 3/0238; G06F 3/03547; G06F 3/041; G06F 3/0412; G06F 3/046; G06F 3/047; G06F 2203/041; G06F 3/044; G06F 3/045; G06F 3/03548; G06F 1/1615; G06F 1/1677; G06F 1/3206; H01H 13/70
USPC .................. 345/156, 168–169, 173–174, 184
See application file for complete search history.

(56) References Cited

U.S. PATENT DOCUMENTS

| | | | |
|---|---|---|---|
| 2006/0192770 A1* | 8/2006 | Suzukawa ............. | G06F 1/1616 345/173 |
| 2007/0061564 A1* | 3/2007 | Park et al. ..................... | 713/100 |
| 2013/0054998 A1* | 2/2013 | Wyatt .................... | G06F 1/3265 713/323 |

* cited by examiner

*Primary Examiner* — Lun-Yi Lao
*Assistant Examiner* — Jarurat Suteerawongsa
(74) *Attorney, Agent, or Firm* — Harness, Dickey & Pierce, P.L.C.

(57) ABSTRACT

A method for automatic control is provided, which is applied to an electronic apparatus including a first controller, a second controller, a first input apparatus and a first display unit. The first input apparatus is rotatably connected to the first display unit. When the electronic apparatus is in a sleeping state, the second controller is in a sleeping state and the first controller is in an operating state. The method includes: obtaining a first angle between the first input apparatus and the first display unit in the case that the electronic apparatus is in the sleeping state; determining whether the first angle satisfies a first preset condition; and controlling the first input apparatus to be in a turn-off state by the first controller in the case that the first angle satisfies a first preset condition.

12 Claims, 5 Drawing Sheets

METHOD AND DEVICE FOR AUTOMATIC CONTROL

This application claims the priority for Chinese Patent Application No. 201210495551.0, entitled "METHOD AND DEVICE FOR AUTOMATIC CONTROL", filed with the Chinese Patent Office on Nov. 28, 2012, which is incorporated by reference in its entirety herein.

FIELD

The present disclosure relates to the field of communication and electronics, and in particular to a method and device for automatic control.

BACKGROUND

With the development of electronic technology, some new notebook computers, the form of which may be freely transformed between a notebook and a PAD, have been appeared. A keyboard and a touch panel need to be turned off when the new notebook computer is in the PAD state, to avoid a faulty operation caused by pressing the keyboard and the touch panel in the PAD state. Two methods in prior art are used to turn off the key board and the touch panel. One method is implemented by a double EC, in which the keyboard is designed to be removable to turn off the keyboard and the touch panel in the PAD mode. The other method is more commonly used at present, in which the keyboard and the touch panel are turned off in a driver layer. In this method, an electronic apparatus receives information of an angle between the keyboard and a display screen, which is detected by a sensor, and then CPU may process the information of the angle. When the angle between the keyboard and the display screen is larger than a preset value, the CPU control drivers to turn off the keyboard and the display screen in the driver layer, so as to turn off the keyboard and the display screen.

In the implementation of the technical scheme of the embodiments of the present disclosure, at least following technical problems in the prior art are found by the inventors.

When the electronic apparatus operates in the PAD mode, if the electronic apparatus is in a sleeping state, the CPU may also be in the sleeping state and do not operate. In this case, the CPU can not control the keyboard and the touch panel to be in a turn-off state. When the electronic apparatus returns to the operating state from the sleeping state, the CPU can not turn off at once the driver for the keyboard and the driver for the display screen in the driver layer, and hence the CPU can not turn off at once the keyboard and the touch panel. In this case, a user may press a key of the keyboard or the touch panel when the user operates the electronic apparatus in the PAD mode, thus causing a faulty operation. Therefore, there is a technical problem that the electronic apparatus in the PAD mode can not control the keyboard and the touch panel to be in the turn-off state in a wake-up period from the sleeping state to the operating state.

In addition, since the electronic apparatus in the PAD mode can not control the keyboard and the touch panel to be in the turn-off state in the wake-up period from the sleeping state to the operating state, the user may make a misoperation for the keyboard and the touch panel when the electronic apparatus operates in the PAD mode, thereby reducing the user experience.

SUMMARY

A method and device for automatic control is provided according to embodiments of the disclosure, so as to solve the technical problem in the prior art that the electronic apparatus in PAD mode can not control the keyboard and the touch panel to be in the turn-off state in the wake-up period from the sleeping state to the operating state.

To solve the above-mentioned technical problem, a method for automatic control is provided according to embodiments of the disclosure, the method is applied to an electronic apparatus including a first controller, a second controller, a first input apparatus and a first display unit, the first input apparatus is rotatablely connected to the first display unit, and the second controller is in a sleeping state and the first controller is in an operating state in the case that the electronic apparatus is in a sleeping state. The method includes:

obtaining a first angle between the first input apparatus and the first display unit in the case that the electronic apparatus is in the sleeping state;

determining whether the first angle satisfies a first preset condition; and controlling the first input apparatus to be in a turn-off state by the first controller in the case that the first angle satisfies the first preset condition.

Preferably, the obtaining a first angle between the first input apparatus and the first display unit in the case that the electronic apparatus is in the sleeping state includes:

obtaining the first angle between the first input apparatus and the first display unit by a first angle sensor connected between a first input sub-apparatus of the first input apparatus and the first display unit; or obtaining the first angle between the first input apparatus and the first display unit by a first gravity sensor provided on a first input sub-apparatus of the first input apparatus and a second gravity sensor provided on the first display unit; or obtaining the first angle between the first input apparatus and the first display unit by a first acceleration sensor provided on a first input sub-apparatus of the first input apparatus and a second acceleration sensor provided on the first display unit.

Preferably, the determining whether the first angle satisfies a first preset condition includes:

sending the first angle to an information processor of the electronic apparatus; and determining, by the information processor, whether the first angle is within a preset range of angle, wherein the information processor determines that the first angle satisfies the first preset condition in the case that the first angle is within the preset range of angle; and the information processor determine that the first angle does not satisfy the first preset condition in the case that the first angle is not within the preset range of angle.

Preferably, the controlling the first input apparatus to be in a turn-off state by the first controller in the case that the first angle satisfies the first preset condition includes:

receiving determination information sent by the information processor;

generating a control instruction by the first controller according to the determination information, and sending the control instruction to the first input apparatus, wherein the first input apparatus is in the turn-off state based on the control instruction.

Preferably, the controlling the first input apparatus to be in a turn-off state by the first controller includes:

controlling the first input apparatus to be in the turn-off state by an embedded controller; or controlling the first input apparatus to be in the turn-off state by a bus control chip.

Preferably, after the controlling the first input apparatus to be in a turn-off state by the first controller, the method further includes:

obtaining a second angle between the first input apparatus and the first display unit;

determining whether the second angle satisfies a second preset condition; and controlling the first input apparatus to switch from the turn-off state to a turn-on state by the first controller in the case that the second angle satisfies the second preset condition.

On the basis of the same inventive conception, an electronic apparatus is provided according to embodiments of the disclosure, which includes a first controller, a second controller, a first input apparatus and a first display unit, the first input apparatus is rotatablely connected to the first display unit, and the second controller is in a sleeping state and the first controller is still in an operating state in the case that the electronic apparatus is in a sleeping state. The electronic apparatus further includes:

a first obtaining unit adapted to obtain a first angle between the first input apparatus and the first display unit in the case that the electronic apparatus is in the sleeping state; and a first determining unit connected to the first obtaining unit and adapted to determine whether the first angle satisfies a first preset condition, wherein the first controller controls the first input apparatus to be in a turn-off state in the case that the first angle satisfies the first preset condition.

Preferably, the first obtaining unit includes:

an angle sensor connected between a first input sub-apparatus of the first input apparatus and the first display unit and adapted to obtain the first angle between the first input apparatus and the first display unit; or the first obtaining unit includes:

a first gravity sensor provided on a first input sub-apparatus of the first input apparatus; and a second gravity sensor provided on the first display unit, wherein the first angle between the first input apparatus and the first display unit is obtained by the first gravity sensor and the second gravity sensor; or the first obtaining unit includes:

a first acceleration sensor provided on a first input sub-apparatus of the first input apparatus; and a second acceleration sensor provided on the first display unit, wherein the first angle between the first input apparatus and the first display unit is obtained by the first acceleration sensor and the second acceleration sensor.

Preferably, the first determining unit includes:

a first receiving sub-unit adapted to receive the first angle; and a first determining sub-unit connected to the first receiving sub-unit and adapted to determine whether the first angle is within a preset range of angle, wherein the first determining sub-unit determines that the first angle satisfies the first preset condition in the case that the first angle is within the preset range of angle; and the first determining sub-unit determines that the first angle does not satisfy the first preset condition in the case that the first angle is not within the preset range of angle.

Preferably, the first controller includes:

a first receiving unit adapted to receive determination information sent by the first determining sub-unit; and a first controlling unit adapted to generate a control instruction according to the determination information and send the control instruction to the first input apparatus to control the first input apparatus to be in the turn-off state.

Preferably, the first controller includes:

an embedded controller; or a bus control chip.

Preferably, the electronic apparatus further includes:

a second obtaining unit adapted to obtain a second angle between the first input apparatus and the first display unit; and a second determining unit connected to the second obtaining unit and adapted to determining whether the second angle satisfies a second preset condition, wherein the first controller controls the first input apparatus to switch from the turn-off state to a turn-on state in the case that the second angle satisfies the second preset condition.

One or more technical schemes according to the embodiments of the present disclosure have at least the following technical effects or advantages.

(1) By adopting the first controller which is not affected by the sleeping state of the electronic apparatus, the operating states of the keyboard and the touch panel of the electronic apparatus is controlled according to the first angle between the keyboard and the display unit of the electronic apparatus. In this way, the following technical problems in the prior art is solved: when the electronic apparatus operates in the PAD mode, if the electronic apparatus is in the sleeping state, the CPU may also be in the sleeping state and do not operate, and hence the CPU can not control the keyboard and the touch panel to be in the turn-off state; and when the electronic apparatus returns to the operating state from the sleeping state, the CPU can not turn off at once the driver for the keyboard and the driver for the display screen in the driver layer, and hence the CPU can not turn off at once the keyboard and the touch panel; and therefore when the user uses the electronic apparatus in the PAD, a user may press a key of the keyboard or the touch panel mode to cause a misoperation. Therefore, there is such a technical effect that the electronic apparatus in the PAD mode can still control the keyboard and the touch panel to be in the turn-off state in the waking-up time from the sleeping state to the operating state.

(2) In addition, since the electronic apparatus in the PAD mode can still control the keyboard and the touch panel to be in the turn-off state in the wake-up period from the sleeping state to the operating state, the user does not misoperate the keyboard and the touch panel when the electronic apparatus operates in the PAD mode, thereby improving the user experience.

DETAILED DESCRIPTION

A method and device for automatic control is provided according to an embodiment of the disclosure, so as to solve the technical problem in the prior art that the electronic apparatus in a PAD mode can not control a keyboard and a touch panel to be in a turn-off state in a wake-up period from a sleeping state to an operating state.

To solve the above-mentioned technical problem, the general idea of a technical scheme adopted by the embodiment of the disclosure is as follows.

The method for automatic control is provided according to the embodiment of the disclosure, which is applied to an electronic apparatus including a first controller, a second controller, a first input apparatus and a first display unit. The first input apparatus is rotatablely connected to the first display unit. When the electronic apparatus is in the sleeping state, the second controller is in the sleeping state and the first controller is still in the operating state. Therefore, when the electronic apparatus is in the sleeping state: the method includes: firstly obtaining a first angle between the first input apparatus and the first display unit; determining, by the electronic apparatus, whether the first angle satisfies a first preset condition after the first angle is obtained; controlling the first input apparatus to be in the turn-off state by the first controller in the case that a determination result indicates that the first angle satisfies the first preset condition.

By adopting the technical scheme in the embodiment of the disclosure, the electronic apparatus in PAD mode can still control the first input apparatus to be in the turn-off state according to the first angle between the first input apparatus and the first display unit in a wake-up period from the sleeping state to the operating state.

To understand the above-mentioned technical scheme better, a detailed explanation is made to the above-mentioned technical scheme in conjunction with the accompanying drawings of the specification and specific embodiments, and the technical scheme is optimized.

Figure 1:
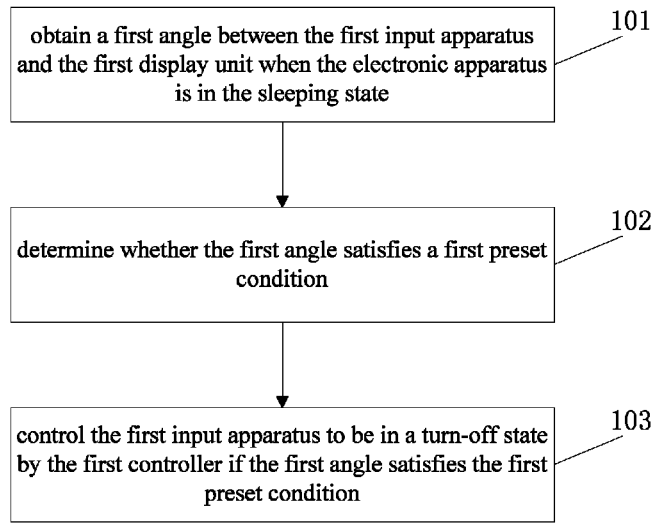
FIG. 1 is a flow chart of a method for automatic control in an embodiment of the disclosure.

A method for automatic control is provided according to an embodiment of the disclosure, so as to solve the technical problem in the prior art that the electronic apparatus in PAD mode can not control the keyboard and the touch panel to be in the turn-off state in the wake-up period from the sleeping state to the operating state. The method for automatic control is applied to the electronic apparatus including a first controller, a second controller, a first input apparatus and a first display unit. The first input apparatus is rotatablely connected to the first display unit. When the electronic apparatus is in the sleeping state, the second controller is in the sleeping state, and the first controller is still in the operating state. The method is as shown in FIG. 1 and includes Steps 101-103.

Step 101: a first angle between the first input apparatus and the first display unit is obtained when the electronic apparatus is in the sleeping state.

In an embodiment, the electronic apparatus to which the method for automatic control according to the embodiments of the disclosure is applied may operate in the PAD mode. The electronic apparatus includes a display unit and a keyboard which may be rotated up to 360 degrees with respect to each other. To understand the technical scheme of the embodiments of the disclosure better, a computer that may operate in the PAD mode is taken as an example of the electronic apparatus in the embodiments of the disclosure for explaining. In this case, the second controller of the electronic apparatus is particularly a CPU of the computer, and the first input apparatus is the keyboard and the touch panel of the computer, and the first display unit is the display screen of the computer. In the case where the computer operates in the PAD mode, the angle between the keyboard and the display screen of the computer is 360 degrees, and the keyboard and the touch panel of the computer may be in the turn-off state. However, the keyboard and the touch panel are controlled to be in the turn-off state by the first controller, rather than the second controller, i.e., the CPU, of the computer. In this way, the first controller of the computer may still control the keyboard and the touch panel of the computer to be in the turn-off state in the wake-up period when the electronic apparatus in the sleeping state returns to the operating state, without being influenced by the operating state of the CPU. However, in the wake-up period from the sleeping state to the operating state, if the first controller of the computer controls the keyboard and the touch panel to be in the turn-off state, it is still necessary to obtain the angle between the keyboard and the display screen.

Specifically, when the electronic apparatus is in the sleeping state, three methods are provided for obtaining the first angle between the first input apparatus and the first display unit.

The first angle between the first input apparatus and the first display unit may be obtained by a first angle sensor connected between an input sub-apparatus of the first input apparatus and the first display unit. In practice, the angle sensor is a sensor adapted to sense an angle to be measured and convert the sensed angle into an available output signal. For example, the angle sensor is mounted between the display screen and the keyboard of the computer. In this way, the angle sensor may sense the angle between the display screen and the keyboard and convert the angle into an electrical signal that may be identified by the computer.

Alternatively, the first angle between the first input apparatus and the first display unit may be obtained by a first gravity sensor provided on the input sub-apparatus of the first input apparatus and a second gravity sensor provided on the first display unit. The gravity sensor is a cantilever type displacement sensor formed by an elastic sensitive element, which drives an electric contact by means of an energy storage spring formed by an elastic sensitive element to convert a change in the gravity into the electrical signal. The gravity sensor is essentially an acceleration sensor. For example, two gravity sensors are mounted on the keyboard and the display screen of the computer respectively. The gravity sensor mounted on the keyboard may measure an acceleration caused by the gravity, and thereby an inclination angle of the keyboard relative to the horizontal plane may be calculated. Based on the same principle, the inclination angle of the display screen relative to the horizontal plane may be obtained by the gravity sensor mounted for the display screen. Accordingly, the angle between the keyboard and the display screen may be calculated based on both the inclination angle of the keyboard relative to the horizontal plane and the inclination angle of the display screen relative to the horizontal plane.

Alternatively, the first angle between the first input apparatus and the first display unit may be obtained by a first acceleration sensor provided on the input sub-apparatus of the first input apparatus and a second acceleration sensor provided on the first display unit. The principle of the acceleration sensor to measure an angle is the same as that of the gravity sensor, in which the inclination angle of an apparatus relative to the horizontal plane is calculated by measuring the acceleration caused by the gravity. For example, two acceleration sensors are mounted on the keyboard and the display screen of the computer respectively. The acceleration sensor mounted on the keyboard may measure the acceleration caused by the gravity, thereby the inclination angle of the keyboard relative to the horizontal plane may be calculated. Based on the same principle, the inclination angle of the display screen relative to the horizontal plane may be obtained by the acceleration sensor mounted on the display screen. Accordingly the angle between the keyboard and the display screen may be calculated based on both the inclination angle of the keyboard relative to the horizontal plane and the inclination angle of the display screen relative to the horizontal plane.

After the first angle between the first input apparatus and the first display unit is obtained, the method of the embodiments of the application goes to Step 102: whether the first angle satisfies a first preset condition is determined.

Figure 2:
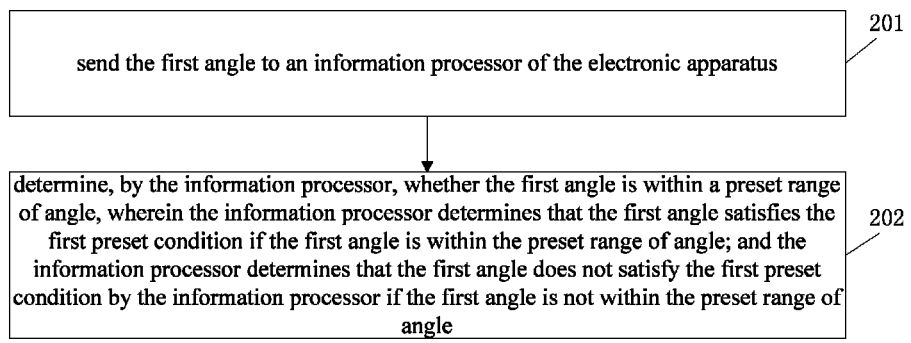
FIG. 2 is a flow chart for determining whether a first angle satisfies a first preset condition in an embodiment of the disclosure.

Specifically, the steps for determining whether the first angle satisfies a first preset condition are shown in FIG. 2 and include Steps 201 and 202.

Step 201: the first angle is transmitted to an information processor of the electronic apparatus. Specifically, the information processor of the electronic apparatus is an electronic device which functions as an information determination. The information processor may determine the received data and make different determination results for different data. For example, in the case where the electronic apparatus is the above-mentioned computer that may operate in the PAD mode, the first angle between the keyboard and the display screen of the computer is firstly obtained by the angle sensor, the gravity sensor or the acceleration sensor of the computer and then may be transmitted to the information processor of the computer. The information processor of the computer may determine whether the first angle satisfies the first preset condition.

Step 202: the information processor determine whether the first angle is within a preset range of angle. The information processor determine that the first angle satisfies the first preset condition if the first angle is within the preset range of angle; and the information processor determines that the first angle does not satisfy the first preset condition if the first angle is not within the preset range of angle. In an embodiment, after the information processor of the electronic apparatus receives the first angle, the information processor may determine whether the first angle satisfies the first preset condition according to the preset range of angle. For example, in the case where the electronic apparatus is the above-mentioned computer that may operate in the PAD mode, the preset range of angle is larger than 270 degrees and smaller than or equal to 360 degrees. If the first angle obtained by the electronic apparatus is 280 degrees, the information processor of the computer may determine that the first angle satisfies the first preset condition because the first angle is within the preset range of angle. If the obtained first angle is 350 degrees, the information processor of the computer may also determine that the first angle satisfies the first preset condition because the first angle is within the preset range of angle. However, if the obtained first angle is 160 degrees, the information processor of the computer may determine that the first angle does not satisfy the first preset condition because the first angle is not within the preset range of angle. If the obtained first angle is 260 degrees, the information processor of the computer may also determine that the first angle does not satisfy the first preset condition because the first angle is not within the preset range of angle.

After the obtained first angle is determined, the method according to the embodiments of the disclosure goes to Step 103: the first controller controls the first input apparatus to be in the turn-off state if the first angle satisfies the first preset condition.

In an embodiment, in the case where the electronic apparatus is the above-mentioned computer that may operate in the PAD mode and the preset range of angle is larger than 270 degrees and smaller than or equal to 360 degrees, if the first angle obtained by the electronic apparatus is 280 degrees, the information processor of the computer may determine that the first angle satisfies the first preset condition, and then the first controller of the computer may turn off the keyboard and the touch panel of the computer. If the obtained first angle is 350 degrees, the information processor of the computer may also determine that the first angle satisfies the first preset condition, and then the first controller of the computer may also turn off the keyboard and the touch panel of the computer. However, if the obtained first angle is 160 degrees, the information processor of the computer may determine that the first angle does not satisfy the first preset condition, and then the first controller of the computer may turn on the keyboard and the touch panel of the computer. If the obtained first angle is 260 degrees, the information processor of the computer may also determine that the first angle does not satisfy the first preset condition, and then the first controller of the computer may also turn on the keyboard and the touch panel of the computer.

Figure 3:
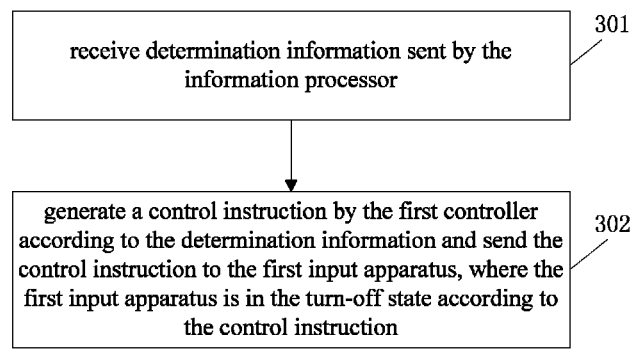
FIG. 3 is a flow chart for controlling a the first input apparatus to be in a turn-off state by a first controller if a first angle satisfies a first preset condition in an embodiment of the disclosure.

In an embodiment, the step for the controlling the first input apparatus to be in the turn-off state by the first controller if the first angle satisfies the first preset condition is shown in FIG. 3 and includes Steps 301-302.

Step 301: determination information sent by the information processor is received. Specifically, when the information processor determines whether the first angle satisfies the first preset condition, the determination information may be generated if the first angle satisfies the first preset condition, and then the information processor may send the determining information to the first controller.

Step 302: the first controller generates a control instruction based on the determination information and sends the control instruction to the first input apparatus. The control instruction is used for causing the first input apparatus to be in the turn-off state. Specifically, based on the determination information, the first controller of the electronic apparatus may generate and send the control instruction for controlling the first input apparatus to be turned off. For example, in the case where the electronic apparatus is the above-mentioned computer that may operate in the PAD mode, if the information processor in the computer determines that the first angle satisfies the first preset condition, based on the determining information, the first controller of the computer may generate and transmit the control instruction for controlling the keyboard and the touch panel to be turned off, so as to turn off the keyboard and the touch panel of the computer.

In an embodiment, the controlling the keyboard and the touch panel of the computer to be in the turn-off state by the first controller of the computer includes the following step.

The keyboard and the touch panel are controlled to be in the turn-off state by an embedded controller mounted in the computer; or The keyboard and the touch panel are controlled to be in the turn-off state by a bus control chip mounted in the computer.

Figure 4:
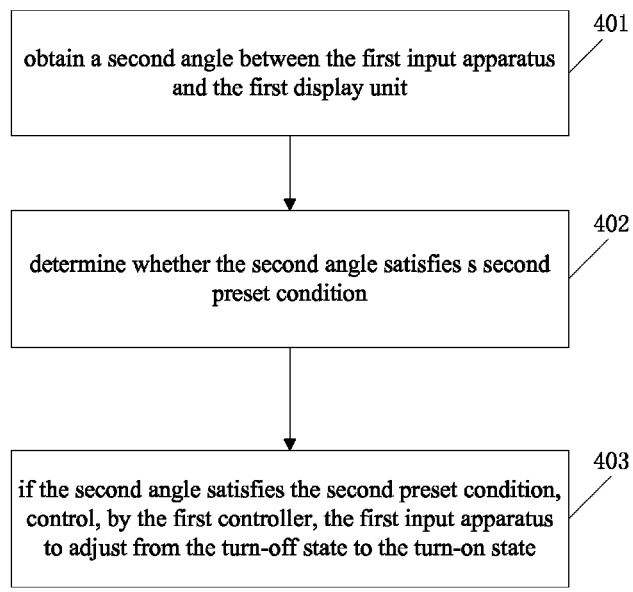
FIG. 4 is a flow chart of a step for controlling the first input apparatus to be in a turn-on state by a first controller in an embodiment of the disclosure.

In an embodiment, when the angle between the first input apparatus and the first display unit of the electronic apparatus is not within the preset range of angle, the first input apparatus of the electronic apparatus should be in a turn-on state. An automatic control method for controlling the first input apparatus to be in the turn-on state is shown in FIG. 4 and includes Steps 401-403.

Step 401: a second angle between the first input apparatus and the first display unit is obtained. The second angle indicates that the first input apparatus of the electronic apparatus should be in the turn-on state. The method for obtaining the second angle is the same as the above-mentioned method for obtaining the first angle, which is not repeated herein.

Step 402: whether the second angle satisfies a second preset condition is determined. In the case where the electronic apparatus is the above-mentioned computer that may operate in the PAD mode, the second preset condition corresponds to the above-mentioned first preset condition. Specifically, if the angle between the first input apparatus and the first display unit is smaller than or equal to 270 degrees, that is, if the angle between the first input apparatus and the first display unit is 160 degrees or 260 degrees as in the above-mentioned examples, the angle of 160 degrees or 260 degrees is the second angle.

Step 403: if the second angle satisfies the second preset condition, the first controller controls the first input apparatus to switch from the turn-off state to the turn-on state. In this step, in the case where the electronic apparatus is the above-mentioned computer that may operate in the PAD mode and the second angle is 160 degrees or 260 degrees, the first controller may controls the first input apparatus to switch from the turn-off state to the turn-on state.

To better understand the method for automatic control in the embodiments of present application by those skilled in the art, the above-mentioned technical scheme is explained by taking examples as follows. In the case where the electronic apparatus is the computer that may operate in the PAD mode and the angle between the keyboard and the display screen of the computer is larger than 270 degrees, the computer may control the keyboard and the touch panel to be in the turn-off state. When the angle between the keyboard and the display screen is smaller than or equal to 270 degrees, the computer may control the keyboard and the touch panel to be in the turn-on state. The first controller for controlling the states of the keyboard and the touch panel is different from the CPU of the computer. The CPU of the computer may be in the sleeping state and does not operate when the computer is in the sleeping state. However, the first controller of the computer is not influenced by the state of the computer, that is, the first controller may control the keyboard and the touch panel of the computer to be turned off or turned on according to the preset range of angle and the obtained angle between the keyboard and the display screen even when the computer is in the sleeping state.

Figure 5:
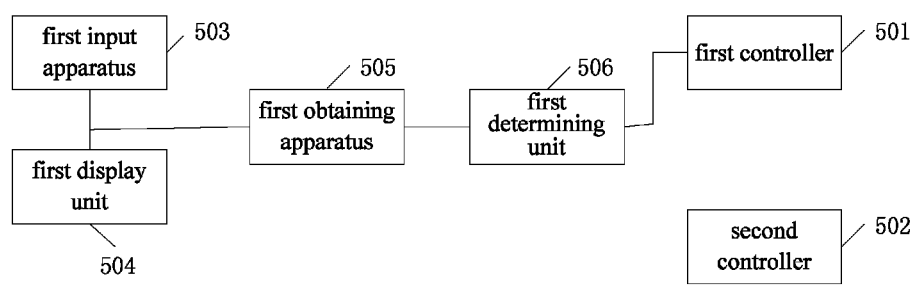
FIG. 5 is a structural diagram of an electronic apparatus in an embodiments of the disclosure.
Figure 6:
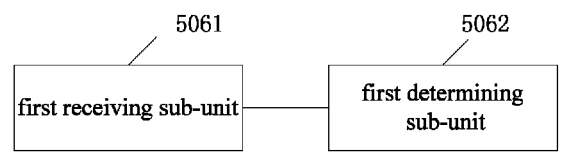
FIG. 6 is a structural diagram of a first determining unit in an embodiment of the disclosure.
Figure 7:
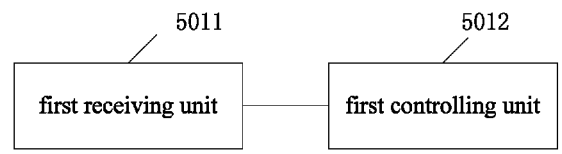
FIG. 7 is a structural diagram of a first controller in an embodiment of the disclosure.

Based on the same inventive concept, the embodiments of the present application further provide an electronic apparatus corresponding to the method for automatic control. The specific structural diagram of the electronic apparatus is shown in FIG. 5. The electronic apparatus includes a first controller 501, a second controller 502, a first input apparatus 503 and a first display unit 504. The first input apparatus 503 is rotatablely connected to the first display unit 504. When the electronic apparatus is in the sleeping state, the second controller 502 is in the sleeping state and the first controller 501 is in the operating state. The electronic apparatus further includes a first obtaining unit 505 and a first determining unit 506.

The first obtaining unit 505 is adapted to obtain a first angle between the first input apparatus and the first display unit when the electronic apparatus is in the sleeping state.

The first determining unit 506 is connected to the first obtaining unit 505 and adapted to determine whether the first angle satisfies a first preset condition.

The first controller 501 controls the first input apparatus 503 to be in the turn-off state if the first angle satisfies the first preset condition.

Specifically, the first obtaining unit 505 may be an angle sensor.

The angle sensor is connected between a first input sub-apparatus of the first input apparatus 503 and the first display unit 504, and adapted to obtain the first angle between the first input apparatus 503 and the first display unit 504. In practice, in the case where the electronic apparatus is the computer, the first input apparatus 503 includes the keyboard and the touch panel, the first input sub-apparatus may be the keyboard, and the angle sensor is provided between the keyboard and the display screen of the computer.

Alternatively, the first obtaining unit 505 may be a first gravity sensor and a second gravity sensor.

The first gravity sensor is provided on the first input sub-apparatus of the first input apparatus 503. In practice, in the case where the electronic apparatus is the computer, the first gravity sensor is provided on the keyboard of the computer.

The second gravity sensor is provided on the first display unit 504. In the case where the electronic apparatus is the computer, the second gravity sensor is provided on the display screen of the computer.

The first angle between the first input apparatus 503 and the first display unit 504 is obtained by using the first gravity sensor and the second gravity sensor. In the case where the electronic apparatus is the computer, the first gravity sensor measures the inclination angle between the keyboard and the horizontal plane, and the second gravity sensor measures the inclination angle between the display screen and the horizontal plane, so as to obtain the angle between the keyboard and the display screen, i.e. the first angle.

Alternatively, the first obtaining unit 505 includes a first acceleration sensor and a second acceleration sensor.

The first acceleration sensor is provided on the first input sub-apparatus of the first input apparatus 503. In practice, the first acceleration sensor is provided on the keyboard of the computer in the case where the electronic apparatus is the computer.

The second acceleration sensor is provided on the first display unit 504. In practice, the second acceleration sensor is provided on the display screen of the computer in the case where the electronic apparatus is the computer.

Figure 8:
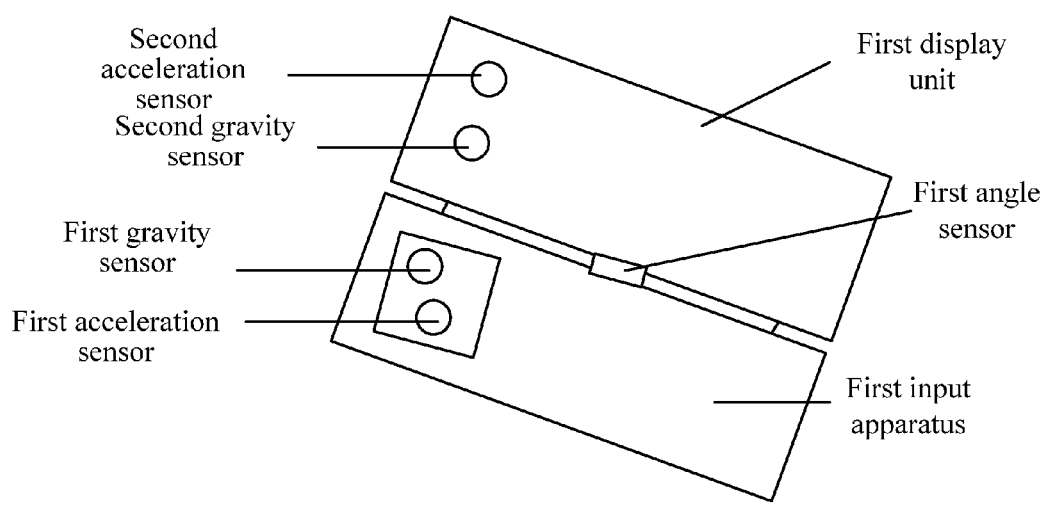
FIG. 8 is an example diagram including a first display unit, a first input apparatus, a first acceleration sensor, a first angle sensor, a first gravity sensor, a second acceleration sensor, and a second gravity sensor.

The first angle between the first input apparatus 503 and the first display unit 504 is obtained by the first acceleration sensor and the second acceleration sensor. In the case where the electronic apparatus is the computer, the first acceleration sensor measures the inclination angle between the keyboard and the horizontal plane, and the second acceleration sensor measures the inclination angle between the display screen and the horizontal plane, so as to obtain the angle between the keyboard and the display screen, i.e. the first angle. FIG. 8 is an example diagram including a first display unit, a first input apparatus, a first acceleration sensor, a first angle sensor, a first gravity sensor, a second acceleration sensor, and a second gravity sensor.

The first determining unit 506 includes a first receiving sub-unit 5061 and a first determining sub-unit 5062.

The first receiving sub-unit 5061 is adapted to receive the first angle.

The first determining sub-unit 5062 is connected to the first receiving sub-unit 5061 and adapted to determine whether the first angle is within a preset range of angle. The first determining sub-unit 5062 determines that the first angle satisfies the first preset condition if the first angle is within the preset range of angle; and the first determining sub-unit 5062 determines that the first angle does not satisfy the first preset condition if the first angle is not within the preset range of angle.

In the case where the electronic apparatus is the above-mentioned computer that may operate in the PAD mode and the preset range of angle is larger than 270 degrees and smaller than or equal to 360 degrees, if the first angle obtained by the electronic apparatus is 280 degrees, the first determining sub-unit 5062 of the computer may determine that the first angle satisfies the first preset condition and then the first controller 501 of the computer may turn off the keyboard and the touch panel of the computer. If the obtained first angle is 350 degrees, the first determining sub-unit 5062 of the computer may also determine that the first angle satisfies the first preset condition, and the first controller 501 of the computer may also turn off the keyboard and the touch panel of the computer. However, if the obtained first angle is 160 degrees, the first determining sub-unit 5062 of the computer may determine that the first angle does not satisfy the first preset condition, and then the first controller 501 of the computer may turn on the keyboard and the touch panel of the computer. If the obtained first angle is 260 degrees, the first determining sub-unit 5062 of the computer may also determine that the first angle does not satisfy the first preset condition, and then the first controller 501 of the computer may also turn on the keyboard and the touch panel of the computer.

The first controller 501 includes a first receiving unit 5011 and a first controlling unit 5012.

The first receiving unit 5011 is adapted to receive determination information sent by the first determining sub-unit 5062.

The first controlling unit 5012 is adapted to generate a control instruction based on the determination information and send the control instruction to the first input apparatus 503, to control the first input apparatus 503 to be in the turn-off state.

Preferably, the first controller 501 includes an embedded controller or a bus control chip.

Specifically, when the angle between the first input apparatus 503 and the first display unit 504 of the electronic apparatus is not within the preset range of angle, the first input apparatus 503 of the electronic apparatus should be in the turn-on state. The electronic apparatus for realizing this function further includes: a second obtaining unit adapted to obtain a second angle between the first input apparatus 503 and the first display unit 504; and a second determining unit connected to the second obtaining unit and adapted to determine whether the second angle satisfies a second preset condition. The first controller 501 controls the first input apparatus to switch from the turn-off state to the turn-on state if the second angle satisfies the second preset condition. In the practical application, the second obtaining unit and the first obtaining unit 505 may be either the same electronic device or different electronic devices, and the second determining unit and the first determining unit 506 may be either the same electronic device or different electronic devices.

In the implementation of the present application, the first controller, the first input apparatus, the first display unit, the first obtaining unit, the first determining unit, the first receiving sub-unit, the first determining sub-unit, the first receiving unit, the first controlling unit, the second obtaining unit and the second determining unit of the electronic apparatus do not indicate names of the specific devices in the apparatus, which only show the functions that the devices may realize. Therefore, some devices that may replace the above-mentioned device and realize the functions of the above-mentioned devices fall into the scope of protection of the present application.

One or more technical schemes according to the embodiments of the present disclosure may realize the following technical effects.

(1) The first controller, which is not influenced by the sleeping state of the electronic apparatus, controls the operating states of the keyboard and the touch panel of the electronic apparatus according to the first angle value between the keyboard and the display unit of the electronic apparatus, thus solving the following technical problem in the prior art. When the electronic apparatus operates in the PAD mode, if the electronic apparatus is in the sleeping state, the CPU may also be in the sleeping state and do not operate, and hence the CPU can not control the keyboard and the touch panel to be in the turn-off state. When the electronic apparatus returns to the operating state from the sleeping state, the CPU can not turn off at once the driver for the keyboard and the driver for the display screen in the driver layer, and hence the CPU can not turn off at once the keyboard and the touch panel. Thus, when the user uses the electronic apparatus in the PAD mode, a user may press a key of the keyboard or the touch panel to cause a misoperation. Therefore, there is such a technical effect that the electronic apparatus in the PAD mode can still control the keyboard and the touch panel to be in the turn-off state in the wake-up period from the sleeping state to the operating state.

(2) In addition, since the electronic apparatus in the PAD mode can still control the keyboard and the touch panel to be in the turn-off state in the wake-up period from the sleeping state to the operating state, the user does not misoperate the keyboard and the touch panel when the user uses the electronic apparatus in the PAD mode, thereby improving the user experience.

The method of the present disclosure is not limited to the specific embodiments, other implementation of which is obtained by those skilled in the art according to the technical scheme of the present disclosure also belongs to the scope of the technical innovation of the present disclosure. It is obvious that various changes and variations can be made by those skilled in the art without departing from the spirit and the scope of the present disclosure. Accordingly, if these changes and variations of the present disclosure belong to the scope of the claims of the present disclosure and the equivalent technology, the present disclosure intends to contain these changes and variations therein.

The invention claimed is:

1. A method for automatic control, applied to an electronic apparatus including a first controller, a second controller, a first input apparatus and a first display unit, wherein the first input apparatus is rotatably connected to the first display unit; in the case that the electronic apparatus is in a sleeping state, the second controller is in a sleeping state and the first controller is in an operating state; and the method comprises:

obtaining a first angle between the first input apparatus and the first display unit by the first controller in the case that the electronic apparatus is in the sleeping state;

determining whether the first angle satisfies a first preset condition by the first controller in the case that the electronic apparatus is in the sleeping state;

controlling the first input apparatus to be in a turn-off state by the first controller in the case that the first angle satisfies the first preset condition and the electronic apparatus is in the sleeping state;

controlling the first input apparatus to be in the turn-off state by the first controller during the process of the electronic apparatus changing from the sleeping state to the operating state; and controlling the first input apparatus to be in the turn-on state by the first controller during the operating state.

2. The method according to claim 1, wherein the obtaining a first angle between the first input apparatus and the first display unit in the case that the electronic apparatus is in the sleeping state comprises:

obtaining the first angle between the first input apparatus and the first display unit by a first angle sensor connected between a first input sub-apparatus of the first input apparatus and the first display unit; or obtaining the first angle between the first input apparatus and the first display unit by a first gravity sensor provided on a first input sub-apparatus of the first input apparatus and a second gravity sensor provided on the first display unit; or obtaining the first angle between the first input apparatus and the first display unit by a first acceleration sensor provided on a first input sub-apparatus of the first input apparatus and a second acceleration sensor provided on the first display unit.

3. The method according to claim 2, wherein the determining whether the first angle satisfies a first preset condition comprises:

sending the first angle to an information processor of the electronic apparatus; and determining, by the information processor, whether the first angle is within a preset range of angle, wherein the information processor determine that the first angle satisfies the first preset condition in the case that the first angle is within the preset range of angle; and the information processor determines that the first angle does not satisfy the first preset condition in the case that the first angle is not within the preset range of angle.

4. The method according to claim 3, wherein the controlling the first input apparatus to be in a turn-off state by the first controller in the case that the first angle satisfies the first preset condition comprises:

receiving determination information sent by the information processor;

generating a control instruction by the first controller based on the determining information, and sending the control instruction to the first input apparatus, wherein the first input apparatus is in the turn-off state based on the control instruction.

5. The method according to claim 4, wherein the controlling the first input apparatus to be in a turn-off state by the first controller comprises:

controlling the first input apparatus to be in the turn-off state by an embedded controller; or controlling the first input apparatus to be in the turn-off state by a bus control chip.

6. The method according to claim 1, wherein after the controlling the first input apparatus to be in a turn-off state by the first controller, the method further comprises:

obtaining a second angle between the first input apparatus and the first display unit;

determining whether the second angle satisfies a second preset condition; and controlling the first input apparatus to switch from the turn-off state to a turn-on state by the first controller in the case that the second angle satisfies the second preset condition.

7. An electronic apparatus, comprising a first controller, a second controller, a first input apparatus and a first display unit, wherein the first input apparatus is rotatably connected to the first display unit; in the case that the electronic apparatus is in a sleeping state, the second controller is in a sleeping state and the first controller is still in an operating state; and the electronic apparatus further comprises:

a first obtaining unit adapted to obtain a first angle between the first input apparatus and the first display unit in the case that the electronic apparatus is in the sleeping state; and a first determining unit connected to the first obtaining unit and adapted to determine whether the first angle satisfies a first preset condition, wherein the first controller controls the first input apparatus to be in a turn-off state in the case that: (i) the first angle satisfies the first preset condition and (ii) during the process of the electronic apparatus changing from the sleeping state to the operating state, and the first controller controls the first input apparatus to be in the turn-on state during the operating state.

8. The electronic apparatus according to claim 7, wherein the first obtaining unit comprises:

an angle sensor connected between a first input sub-apparatus of the first input apparatus and the first display unit and adapted to obtain the first angle between the first input apparatus and the first display unit; or the first obtaining unit comprises:

a first gravity sensor provided on a first input sub-apparatus of the first input apparatus; and a second gravity sensor provided on the first display unit, wherein the first angle between the first input apparatus and the first display unit is obtained by the first gravity sensor and the second gravity sensor; or the first obtaining unit comprises:

a first acceleration sensor provided on a first input sub-apparatus of the first input apparatus; and a second acceleration sensor provided on the first display unit;

wherein the first angle between the first input apparatus and the first display unit is obtained by the first acceleration sensor and the second acceleration sensor.

9. The electronic apparatus according to claim 8, wherein the first determining unit comprises:

a first receiving sub-unit adapted to receive the first angle; and a first determining sub-unit connected to the first receiving sub-unit and adapted to determine whether the first angle is within a preset range of angle, wherein the first determining sub-unit determines that the first angle satisfies the first preset condition in the case that the first angle is within the preset range of angle; and the first determining sub-unit determines that the first angle does not satisfy the first preset condition in the case that the first angle is not within the preset range of angle.

10. The electronic apparatus according to claim 9, wherein the first controller comprises:

a first receiving unit adapted to receive determination information sent by the first determining sub-unit; and a first controlling unit adapted to generate a control instruction according to the determination information, and send the control instruction to the first input apparatus to control the first input apparatus to be in the turn-off state.

11. The electronic apparatus according to claim 10, wherein the first controller comprises:

an embedded controller; or a bus control chip.

12. The electronic apparatus according to claim 7, wherein the electronic apparatus further comprises:
- a second obtaining unit adapted to obtain a second angle between the first input apparatus and the first display unit; and
- a second determining unit connected to the second obtaining unit and adapted to determine whether the second angle satisfies a second preset condition,
- wherein the first controller controls the first input apparatus to switch from the turn-off state to a turn-on state in the case that the second angle satisfies the second preset condition.

* * * * *